(No Model.)

S. STEPHENS.
RENDERING APPARATUS.

No. 422,260.

2 Sheets—Sheet 2.

Patented Feb. 25, 1890.

Witnesses
H. P. Hood,
A. M. Hood.

Inventor
Samuel Stephens

UNITED STATES PATENT OFFICE.

SAMUEL STEPHENS, OF INDIANAPOLIS, INDIANA, ASSIGNOR OF ONE-THIRD TO ALEXANDER C. AYERS, OF SAME PLACE.

RENDERING APPARATUS.

SPECIFICATION forming part of Letters Patent No. 422,260, dated February 25, 1890.

Application filed April 19, 1889. Serial No. 307,823. (No model.)

*To all whom it may concern:*

Be it known that I, SAMUEL STEPHENS, a citizen of the United States, residing at Indianapolis, in the county of Marion and State of Indiana, have invented a new and useful Improvement in Rendering Apparatus, of which the following is a specification.

My invention relates to an improvement on a rendering apparatus for extracting lard or fat from animal substances, for which Letters Patent No. 282,584 were granted to me August 7, 1883. Said rendering apparatus consists, essentially, of a circular or cylindrical tank having a conical bottom with double walls between which steam is circulated, and having a series of interior concentric hollow partitions occupying a fixed relation to the walls of the tank, and having annular open spaces between them, and means for producing a circulation of steam through said partitions and for drawing off the condensed water therefrom.

The object of my present improvement is to provide means for stirring and agitating the contents of the tank, and thereby causing a circulation therein during the process of rendering and cooling, and to provide means for keeping sufficiently fluid the contents of the extreme lower parts of the tank, all as hereinafter fully described.

The accompanying drawings illustrate my invention.

Figure 1:
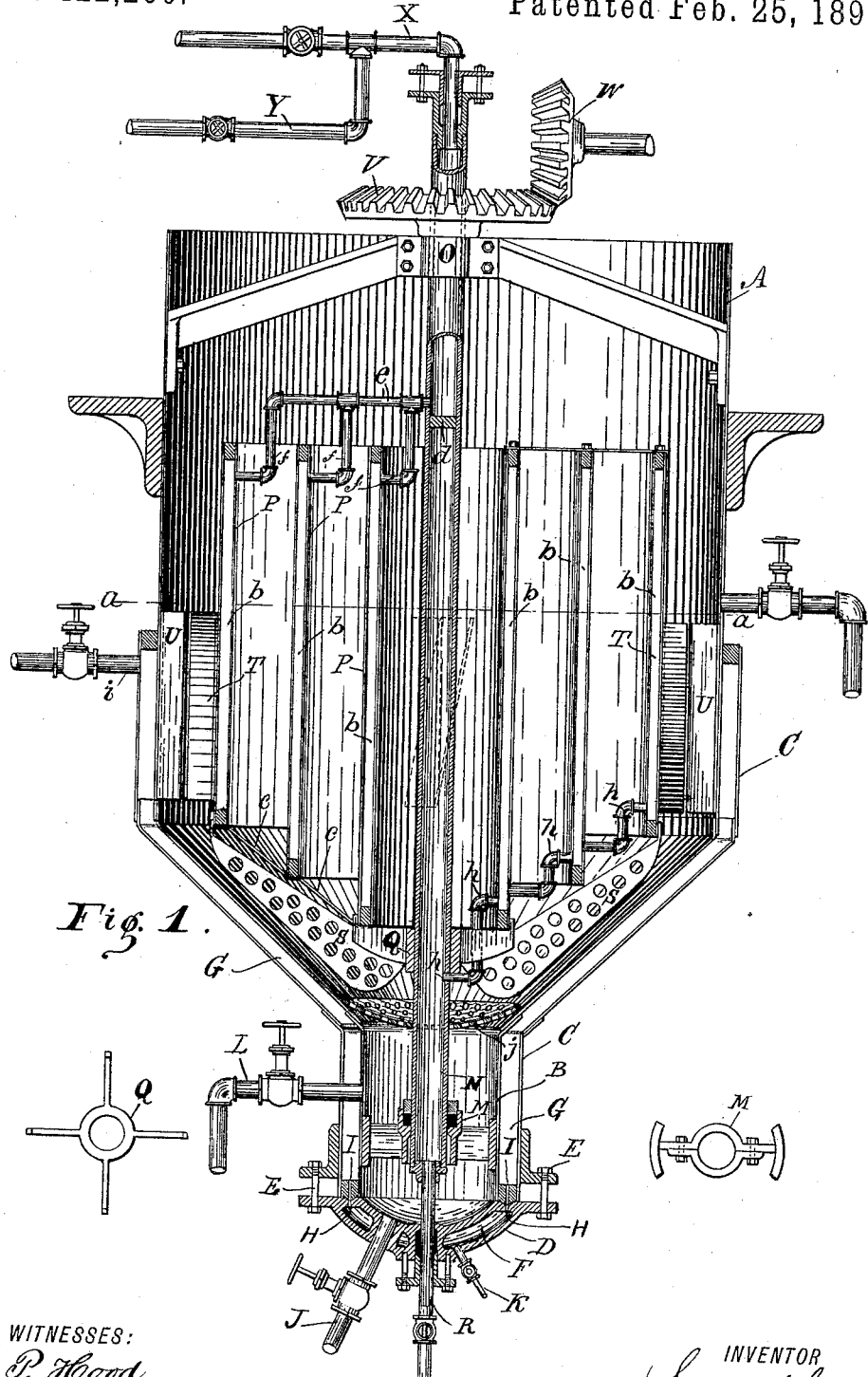
Figure 2:
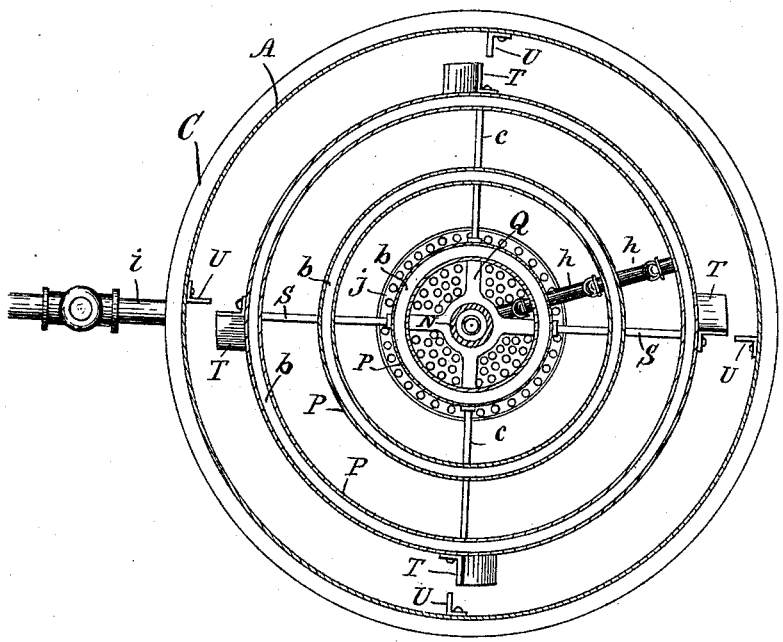

Figure 1 represents a vertical section, and Fig. 2 a transverse section at $a\ a$, Fig. 1.

A is a cylindrical tank made of boiler-iron and having a conical bottom terminating in a cylindrical chamber B. The lower part of the tank, including chamber B, is inclosed in a steam-jacket C. The lower end of chamber B is closed by a hollow cover D, which is secured to the tank by bolts E. The hollow interior F of cover D communicates, when in place, with the steam-space G around the tank through a series of holes H, which register with corresponding holes I in the end of space G. Inserted through cover D is a pipe J, provided with a suitable valve, through which the liquid fat may be drawn off. A pipe K penetrates only to the hollow space F in the cover, for the purpose of drawing off the condense-water from the steam-spaces. A pipe L is inserted in the side of chamber B, which is also for the purpose of drawing off the liquid fat.

Secured in the lower end of chamber B is a step-bearing M, in which is journaled a hollow vertical shaft N, which is journaled at the top also in a bearing O, which is secured to the sides of tank A near the top. The partitions P P P are similar to those shown in my above-mentioned patent. They consist of cylinders of different diameters formed of boiler-iron and having double walls, forming in each an inclosed steam-space $b$. Said partitions are arranged concentrically around shaft N, and are supported thereon by a spider Q, secured to the shaft and connecting-bars $c\ c$, the arrangement being such that the partitions are attached to and revolve with the shaft. Shaft N is provided with a transverse partition $d$, which divides its hollow interior into two parts. A steam-pipe $e$, having branches $f\ f\ f$, connects the interior of shaft N above partition $d$ with the upper ends of the steam-spaces of cylinders P, and the lower ends of said steam-spaces are connected with each other and with shaft N below partition $d$ by pipes $h\ h\ h$. A drain-pipe R extends from the lower end of shaft N out through the cover D.

S S are perforated plates secured to the spider Q and to the outermost partition P and projecting edgewise into the space below the partitions nearly to the conical bottom of the tank. Said plates are for the purpose of stirring the contents of the tank, as hereinafter explained.

Secured to the outer walls of the largest partition P are a series of inclined wings T T, which operate, in connection with corresponding vertical wings U U, secured to the wall of tank A, to break up the contents of the tank and to produce therein an upward and rotary movement.

Shaft N, with the partitions P P P, is rotated by means of a bevel gear-wheel V, secured to the shaft and driven by a pinion W. A steam-pipe X enters the top of shaft N through a suitable stuffing-box. Pipe X is connected with a branch pipe Y, leading to a source of cold-water supply, and pipes X and Y are provided with suitable valves, so that steam or cold water may be directed into shaft N. Steam is supplied to jacket G through a pipe $i$. A removable grating $j$ prevents the coarser particles from falling into chamber B.

In operation tank A is filled nearly to the top with pieces of the material to be rendered, said material being loosely packed between and around the partitions P. Steam is admitted through pipe X to the upper interior of shaft N, and meeting partition $d$ passes out through pipe $e$ and branches $f$ into the hollow walls of partitions P, through which it circulates, passing into shaft N, when condensed, through pipes $h$, thus heating the partitions. Steam is admitted at the same time to jacket C, the condense-water passing out at pipe K, thus heating the lower part of the tank, chamber B, and its cover D. Heretofore those parts which correspond to chamber B and its cover D have been made solid, and it has been found difficult to keep the rendered lard below grating $j$ sufficiently liquid. By my improved construction this difficulty is avoided. When the process of rendering has begun and the contents of the tank have become semi-liquid, so that the denser parts begin to settle, shaft N is put in motion, carrying in its revolutions partitions P, plates S S, and wings T T, thus thoroughly stirring the contents of the tank, and also producing, by means of the inclined wings T, an upward movement in the space between the wall of the tank and the outer partition P, which is followed by a downward movement of the material between said partitions. The entire contents of the tank are thus more quickly brought in contact with the heated walls of the tank and partitions P than in my former device, where the cylindrical partitions P were secured to the walls of the tank and remained stationary.

I claim as my invention—

1. In a rendering apparatus, the combination, with a cylindrical tank, of a vertical shaft arranged centrally in said tank and mounted in suitable bearings, so as to revolve thereon, and a series of cylindrical partitions of different diameters having double walls arranged concentrically within said tank, with annular spaces between them, and mounted on said shaft, so as to revolve therewith, substantially as shown and described.

2. In a rendering apparatus, the combination, with the tank having a conical bottom and a cylindrical extension below said bottom of less diameter than the tank, of the steam-jacket arranged to inclose the bottom and said cylindrical extension, and the hollow cover arranged to close said extension, said steam-jacket and cover having each a series of openings on their meeting faces, which register with each other and communicate with their respective interiors, whereby communication is established between said interiors when the cover is closed.

SAMUEL STEPHENS.

Witnesses:
H. P. HOOD,
A. M. HOOD.